July 23, 1957
L. TILLER
2,799,945
CALIPER FOR MEASURING ROTATING PADDED IRONER ROLLS
Filed March 12, 1954
2 Sheets-Sheet 1
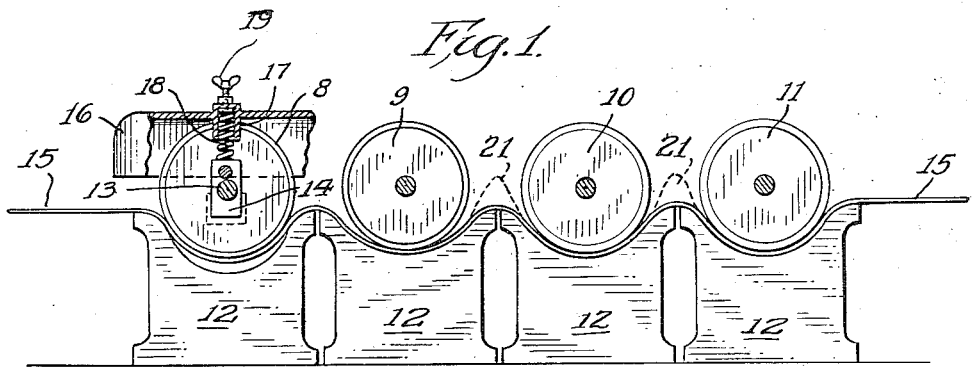
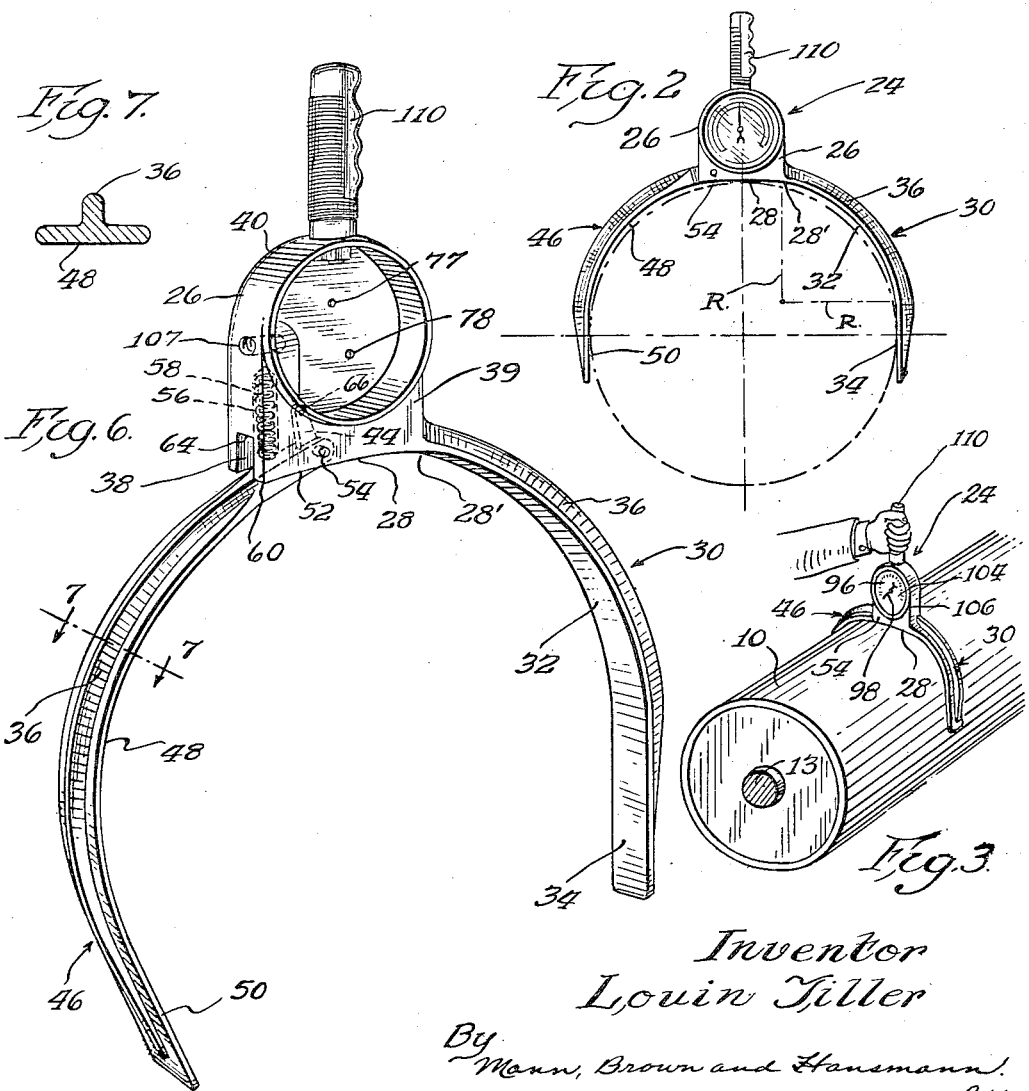
Inventor
Louin Tiller
By Mann, Brown and Hansmann
Attys.

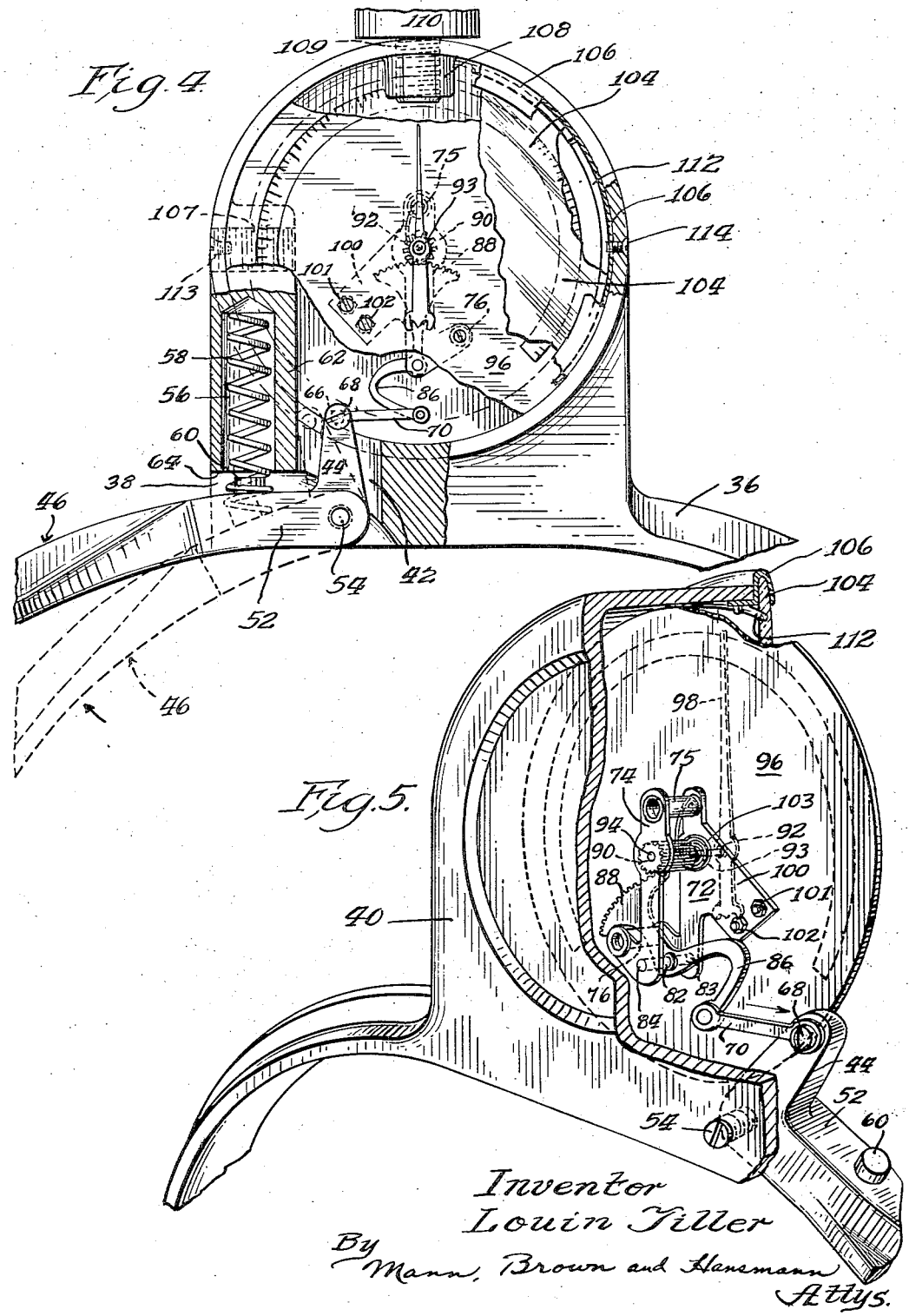

2,799,945

Patented July 23, 1957

2,799,945

CALIPER FOR MEASURING ROTATING PADDED IRONER ROLLS

Louis Tiller, Oklahoma City, Okla., assignor, by mesne assignments, to Forse Corporation, Anderson, Ind.

Application March 12, 1954, Serial No. 415,855

10 Claims. (Cl. 33—178)

This invention relates to a caliper for ironer rolls, and more particularly is adapted for making measurements while the ironer is in operation.

Approximately 50% of every laundry's work must be processed by the flatwork ironer, and thus the laundry's production is largely dependent on the speed and efficiency of the flatwork ironer. Of equal importance, however, is the quality of the work performed by the ironer.

The speed, ironer efficiency, and quality of work are largely dependent on the provision of proper padding for the ironer rolls. This, in turn, is determined by two factors, proper roll size, and accurate graduation. These factors can be accurately determined only when the ironer is in operation. When operating the padded rolls are damp and hence are highly compressible, but stopping the ironer allows the padding to dry, thus causing it to swell. In addition stopping the ironer creates slack in the covers and causes the roll diameter to increase.

Various devices for measuring roller diameter have been tried—tapes, bands, machinist's calipers, and fixed maximum-minimum calipers, to mention a few. These methods required that the ironer be stopped while the rolls are being measured—some even required that the rolls be raised from their chests. Also, the accuracy of the readings depends on the skill of the individual doing the measuring, and even at best none of these methods is dependably accurate.

Accordingly the objects of the present invention are to provide a caliper which may be used to take measurements during operation of the ironer rolls; which is automatically adjustable to the roll being measured; which will indicate whether a roll is out of round; which is capable of measuring a range of roller sizes; which is accurate throughout these ranges; and which is economical and of sturdy construction.

Other objects and advantages of the invention will be apparent during the course of the following description.

In the accompanying drawings forming a part of this specification, and in which like numerals are employed to designate like parts throughout the same, Fig. 1 is a side elevational view of a laundry ironer illustrating the rollers riding in the chests;

Fig. 2 is a side view of a roller illustrating the proper application of the caliper of the present invention to an ironer roller to provide the three point contact so vital to accurate measurements;

Fig. 3 is a perspective view also showing the caliper applied to a roller;

Fig. 4 is a front view of the caliper, partly in section, and with a portion of the glass face and dial broken away;

Fig. 5 is a rear perspective view of the caliper with a portion of the case broken away to illustrate the gauge mechanism;

Fig. 6 is a front perspective view of the caliper with the gauge and dial removed; and Fig. 7 is a sectional view of a caliper leg taken on the line 7—7 of Fig. 6.

As shown in Fig. 1, a flatwork ironer consists of a series of ironer rolls 8, 9, 10 and 11 that ride in the chests 12. The shaft 13 of each roll is mounted in a bearing box 14, as is shown in the case of the roll 8. The work 15 travels between the rolls and the chests so that the speed, efficiency, and quality of work are dependent upon the snugness of the fit and the amount of contact surface therebetween.

The most critical factor in achieving the requisite snug fit and maximum contact surface is the provision of proper padding on the ironer rolls. The padding may be said to be proper when the ironer rolls have a smooth circumference and when a maximum contact surface exists between the rolls and the chests.

In Fig. 1 the roll 8 illustrates the effect of overpadding. The roll rides only on the lips of the chest and is unable to seat properly in the chest. The roll 9, on the other hand, illustrates the effect of underpadding wherein the roll seats in the chest, but does not contact the lips of the chest. In either of the above cases the effective heat transfer is greatly reduced by reason of the limited contact between the roll and chest.

Rolls 10 and 11 in Fig. 1 are properly padded and illustrate the proper seating of the rolls in the chest to provide maximum contact surface therebetween. It is apparent that there is a critical roller size that produces this maximum contact surface and that this size is dependent on the curvature of the chest.

Even the best padded roll will have a tendency to rise off the chest unless there is bar pressure to hold it down. Since heat transfer through air is very ineffectual, and since bar pressure tends to eliminate air space between the chest and the roll and the work, proper bar pressure is a vital factor in ironing efficiency. Pressure is applied by means of the pressure bar 16 which runs the length of the ironer. Within a housing 17 carried by the pressure bar is received a pressure spring 18 that acts upon the bearing box 14 to maintain a steady pressure between the roll and the chest. The amount of pressure may be adjusted by a wing-headed screw 19 that rides in a housing 17 and bears on the spring 18. It will be understood that both ends of each roll are similarly equipped with bearing boxes and adjustable springs.

Related to ironer efficiency is the fact that proper travel of the work 15 through the ironer is achieved when the rolls are graduated so that each roll is slightly larger than the roll before it. If the rolls are not properly graduated, the work will buckle or loop up between the rolls, as indicated by the dotted line 21, between rolls 10 and 11. In this event, the work will not contact the lips of the chest, thereby losing valuable heating surface. Even though the rolls are graduated, the range of roll size must still be within a very limited range, and thus it follows that the steps of graduation are quite small and require, therefore, an accurate measuring device.

In every case it is necessary that the roundness and diameter determinations be made while the ironer is in operation and the caliper of the present invention, designated generally as 24, is particularly useful for such determinations.

The caliper comprises a case 26 preferably cast in aluminum and having a substantially straight bottom portion 28 and a fixed caliper leg 30 integral with the case and adjacent to the bottom portion thereof. The fixed leg 30 consists of an arcuate intermediate portion 32 and a straight free end 34. One end of the bottom portion of the case is slightly curved, as shown at 28', to define, with the adjacent arcuate portion 32 of the fixed leg 30, a smooth continuous surface. The curved surface defined by the bottom portion of the case and the arcuate portion of the fixed leg has a constant radius of curvature and traverses an angle of 90°. Therefore, the plane defined by the straight free end 34 of the fixed leg 30 is perpendicular to the plane defined by the straight bottom portion 28 of the case 26.

To lend rigidity to it, the leg 30 is provided with a central rib 36 that reinforces the wide and smooth contacting surface defined by the portions 32 and 34.

The other end of the bottom portion of the case is bifurcated to form a notch 38 between the front face 39 and back face 40 of the case. The notch 38 communicates with the interior of the case through a passage 42 through which an upwardly extending tongue portion 44 of the movable leg 46 is adapted to extend.

The movable leg 46 is complementary to the fixed leg 30. The arcuate intermediate portion 48 of the movable leg is of equal length and has the same radius of curvature as does the arcuate intermediate portion 32 of the fixed leg. Similarly, the straight free end portion 50 of the movable leg is comparable to the straight free end portion 34 of the fixed leg. Also, the bottom portion of the case adjacent the bifurcation is slightly curved in the same manner and to the same degree as is the bottom portion adjacent the fixed leg 30, thus providing the caliper with a symmetrical bearing surface.

The upper end 52 of the movable leg is adapted to fit within the notch 38 and is pivotally secured to the case 26 by means of a screw 54.

A bore 56 formed in the case 26 is also in communication with the notch 38. A helical follower spring 58 is mounted in the bore 56 and extends outwardly thereof to bear against the upper end 52 of the movable leg. The spring 58 telescopes over a button 60 formed on the upper end of the movable leg, and is held in position thereby. The spring 58 bears against the movable leg 46 to continually urge it toward the fixed leg 30.

Inasmuch as ironer rolls are of standard sizes, the ironer caliper need only be adapted to measure diameters over a limited range. The operating roll size is specified by the manufacturer, and for standard roll ironers the diameter ranges from a 12⅛" minimum to a 12⅜" maximum, and for super roll ironers, it ranges from a 13⅛" minimum to a 13⅜" maximum. The caliper of the present invention is capable of measuring both of these standard size rolls, although, of course, separate calipers could be used for each roll size, if desired.

In either arrangement it is apparent that the travel of the movable leg 46 need only be sufficient to span the desired ranges, in fact, it is desirable that the travel be limited, as will be clearly explained hereinafter.

In the present invention the travel of the movable leg 46 in the direction of minimum diameter is limited by the abutment of the tongue 44 against the side wall 62 of the passage 42. This minimum diameter position is shown by dotted lines in Fig. 4. The travel in the direction of maximum diameter is limited by the abutment of the upper end 52 of the movable leg against the roof 64 of the notch 38.

At its tip the upwardly extending tongue 44 is provided with a tapped hole 66. A screw 68 is received in the tapped hole 66 and serves to secure one end of a connecting link 70 to the tongue 44. The other end of the link 70 is connected to the indicating mechanism of the caliper of the present invention.

As best shown in Fig. 5, the indicating mechanism is mounted in the recessed interior portion of the case and includes a mounting frame having a front plate 72 and a back plate 74 spaced from each other by a pair of posts 75 and 76. Each of the posts is provided with a coaxially tapped hole that permits the mounting frame to be secured to the back of the case by a pair of screws which pass through the holes 77 and 78 in the case and are received in the tapped holes of the posts.

An actuating lever is rigidly mounted on a shaft 82 journaled in a pair of opposed mounting holes 83 and 84 provided in the front and back plates, respectively. The U-shaped arm 86 of the actuating lever is connected to the link 70 while the driving arm of the actuating lever includes a segmental gear 88, the teeth of which are adapted to engage the teeth of a pinion gear 90. The pinion gear 90 is rigidly secured to a shaft 92 that is also journaled in a pair of opposed mounting holes 93 and 94 provided in the front and back plates, respectively. A portion of the shaft 92 extends past the front plate 72 and a calibrated dial plate 96 and pointer 98 are telescoped over the shaft and secured thereon. The dial plate 96 is secured to a flange portion 100 of the front mounting plate by a pair of screws 101 and 102, and the pointer 98 is rigidly attached to the shaft 92. A clock spring 103 is also mounted on the shaft 92 in order to eliminate backlash, the inner end is secured to the shaft 92 and the other end is secured to the frame post 75.

A glass face 104 seals the front of the case and is held in place by a metal rim 106, a sealing ring 112 and a pair of retaining screws 113 and 114. The dial plate 96 is provided with a calibrated scale covering a range from 11⅝" to 13⅞", though, obviously, the particular span is a matter of design.

Finally a pair of tapped holes 107 and 108 are provided in the case 26. These holes are each adapted to receive a threaded stud 109 that extends from a handle 110. The handle 110 may be mounted in either of these holes as may be convenient.

Because of the limited travel of the movable arm, a greatly expanded scale may be employed. The range of travel may be restricted to the pertinent range of roller diameters and the gear ratio of the indicating mechanism may be selected so that this range represents one revolution of the pointer. Thus, the pertinent range occupies the entire dial face and the limited travel of the movable arm eliminates the possibility of multiple readings. The use of the expanded scale permits one to make measurements with extreme care and accuracy with the caliper of the present invention. It should be noted that the limited travel feature also eliminates the possibility of overtaxing and damaging the clock spring 103 by preventing more than one revolution.

In applying the ironer caliper to the measurement of ironer rolls it is usually most convenient to screw the handle 110 into the tapped hole 108 at the top of the case 26 and use the caliper as shown in Fig. 3. As previously described the measurements should always be made with the ironer in operation and the rolls turning. The caliper is set on the padded roll 10, see Fig. 3, at a right angle to the shaft so that the fixed leg 30 and the movable leg 46 span the diameter of the roll and so that the bottom portion 28 of the case is also in contact with the roll. This provides the three point contact which is absolutely necessary to the accurate functioning of the present invention.

With the caliper so positioned on the roll, the follower spring 58 automatically urges the movable arm 46 into contact with the roll. The spring 58 has only enough strength to continuously adjust the leg to the roll, but is not strong enough to compress the pad. The bearing surfaces of the caliper that are in contact with the roll are large enough not to dig into the roll, and smooth enough to avoid drag.

As the movable leg 46 adjusts to the roll and is caused to pivot about the screw 54, the tongue 44, through the collecting link 70, drives the actuating lever about its pivot shaft 82. This causes the segmental gear 88 to drive the pinion gear 90 and rotate the pointer 98 to indicate the correct diameter of the roll being measured.

If the roll is out of round so that its diameter varies, the pointer 98 will oscillate as the roll turns.

The three point contact is the feature that permits accurate readings over a range of diameters. Using this principle accurate readings may be obtained either by adjusting the contour of the legs of the calipers or by properly calibrating the scale or by a combination of both.

In the present embodiment, within the pertinent range, the contact with the roller always occurs at the substantially straight portions 28, 34, and 50 of the bearing surface of the caliper. As shown in Fig. 2, the midpoint of the travel of the movable leg 46 brings the substantially straight portion 50 of the movable leg into parallel relationship with the substantially straight portion 34 of the fixed leg, so that the caliper will read the true diameter for rollers of this size. For sizes varying from this, the scale may be calibrated to compensate for errors.

Thus it may be seen that the objects of the present invention have been accomplished in that the large smooth bearing surfaces facilitate the taking of measurements during the actual operation of the ironer; the follower spring automatically adjusts the caliper to the roll size to not only indicate diameter but also to indicate if a roll is out of round; the three point contact permits accurate measurements over a range of roll diameters; and the caliper is sturdily constructed and economical to produce.

It should be understood that the foregoing description of the preferred form of the invention is for the purpose of complying with Section 112, Title 35 of the United States, and that the appended claims should be construed as broadly as the prior art will permit.

I claim:

1. For measuring rotating padded ironer rolls, a caliper comprising a case, a fixed leg integral with said case, a movable leg pivotally mounted on said case, a rotatable pointer-indicating mechanism mounted in said case, means mounted in said case for driving said mechanism, and means linking said movable leg to said driving means, said fixed leg, movable leg, and case having cooperating, smoothly merging bearing surfaces defining a substantially smooth and continuous contact surface.

2. For measuring rotating padded ironer rolls, a caliper comprising a case having a bottom portion including a bearing surface, a fixed leg integral with said case adjacent one end of said bottom portion, said fixed leg being provided with a bearing surface, a movable leg pivotally mounted on said case adjacent the other end of said bottom portion, said movable leg being provided with a bearing surface cooperating with the bearing surface of said fixed leg and the bearing surface of said bottom portion to provide a three-point contact arrangement, the bearing surface of the fixed leg merging smoothly with the bearing surface of the case and the latter merging smoothly with the bearing surface of the movable leg to provide a substantially smooth and continuous contact surface, an indicating mechanism mounted in said case, and means connecting said indicating mechanism and said movable leg.

3. For measuring rotating padded ironer rolls, a caliper comprising a case having a bottom portion including a bearing surface, a fixed leg integral with said case adjacent one end of said bottom portion, said fixed leg being provided with a bearing surface, a movable leg pivotally mounted on said case adjacent the other end of said bottom portion, said movable leg being provided with a bearing surface cooperating with the bearing surface of said fixed leg and the bearing surface of said bottom portion to provide a three-point contact arrangement, the bearing surface of the fixed leg merging smoothly with the bearing surface of the case and the latter merging smoothly with the bearing surface of the movable leg to provide a substantially smooth and continuous contact surface, resilient means mounted on said case, said resilient means being adapted to bear against said movable leg to continuously urge it towards said fixed leg, an indicating mechanism mounted in said case, and means connecting said indicating mechanism and said movable leg.

4. For measuring rotating padded ironer rolls, a caliper comprising a case having a bottom portion including a substantially straight bearing surface, a fixed leg integral with said case adjacent one end of said bottom portion, said fixed leg being provided with a substantially straight bearing surface, a movable leg pivotally mounted on said case adjacent the other end of said bottom portion, said movable leg being provided with a substantially straight bearing surface cooperating with the bearing surface of said fixed leg and the bearing surface of said bottom portion to provide a three-point contact arrangement, the bearing surface of the fixed leg merging smoothly with the bearing surface of the case and the latter merging smoothly with the bearing surface of the movable leg to provide a substantially smooth and continuous contact surface, resilient means mounted on said case, said resilient means being adapted to bear against said movable leg to continuously urge it towards said fixed leg, an indicating mechanism mounted in said case, and means connecting said indicating mechanism and said movable leg.

5. For measuring rotating padded ironer rolls, a caliper comprising a case having a bottom portion including a smooth substantially straight bearing surface having substantial width, a fixed leg integral with said case adjacent one end of said bottom portion, said fixed leg being provided with a smooth substantially straight bearing surface having substantial width, a movable leg pivotally mounted on said case adjacent the other end of said bottom portion, said movable leg being provided with a smooth substantially straight bearing surface having substantial width cooperating with the bearing surface of said fixed leg and the bearing surface of said bottom portion to provide a three-point contact arrangement, resilient means mounted on said case, said resilient means being adapted to bear against said movable leg to continuously urge it towards said fixed leg, an indicating mechanism mounted in said case, and means connecting said indicating mechanism and said movable leg.

6. For measuring rotating padded ironer rolls, a caliper comprising a case having a bottom portion including a bearing surface, a fixed leg intergral with said case adjacent one end of said bottom portion, said fixed leg being provided with a bearing surface, the other end of said bottom portion having a notch formed therein, said case having a passage communicating with said notch and having a bore in communication with said notch, a movable leg pivotally secured within said notch, said movable leg having a tongue portion extending within said passage, said movable leg being provided with a bearing surface cooperating with the bearing surface of said fixed leg and the bearing surface of said bottom portion to provide a three-point contact arrangement, the bearing surface of the fixed leg merging smoothly with the bearing surface of the case and the latter merging smoothly with the bearing surface of the movable leg to provide a substantially smooth and continuous contact surface, a follower spring mounted in said bore, said spring being adapted to bear against said movable leg to continuously urge it towards said fixed leg, an indicating mechanism mounted in said case, and means connecting said indicating mechanism and said tongue.

7. For measuring rotating padded ironer rolls, a caliper comprising a case having a bottom portion including a substantially straight bearing surface, a fixed leg integral with said case adjacent one end of said bottom portion, said fixed leg being provided with a substantially straight bearing surface, the other end of said bottom portion having a notch formed therein, said case having a passage communicating with said notch and having a bore in communication with said notch, a movable leg pivotally secured within said notch, said movable leg having a tongue portion extending within said passage, said movable leg being provided with a substantially straight bearing surface cooperating with the bearing surface of said fixed leg and the bearing surface of said bottom portion to provide a three-point contact arrangement, the bearing surface of the fixed leg merging smoothly with the bearing surface of the case and the latter merging smoothly with the bearing surface of the movable leg to provide a substantially smooth and continuous contact surface, a follower spring mounted in said bore, said spring being adapted to bear against said movable leg to continuously urge it towards said fixed leg, an indicating mechanism mounted in said case, and means connecting said indicating mechanism and said tongue.

8. For measuring rotating padded ironer rolls, a caliper comprising a case having a bottom portion including a smooth substantially straight bearing surface having substantial width, a fixed leg integral with said case adjacent one end of said bottom portion, said fixed leg being provided with a smooth substantially straight bearing surface having substantial width, the other end of said bottom portion having a notch formed therein, said case having a passage communicating with said notch and having a bore in communication with said notch, a movable leg pivotally secured within said notch, said movable leg having a tongue portion extending within said passage, said movable leg being provided with a smooth substantially straight bearing surface having substantial width cooperating with the bearing surface of said fixed leg and the bearing surface of said bottom portion to provide a three-point contact arrangement, a follower spring mounted in said bore, said spring being adapted to bear against said movable leg to continuously urge it towards said fixed leg, an indicating mechanism mounted in said case, and means connecting said indicating mechanism and said tongue.

9. For measuring rotating padded ironer rolls, a caliper comprising a case having a bottom portion including a bearing surface, a fixed leg integral with said case adjacent one end of said bottom portion, said fixed leg being provided with a bearing surface, the other end of said bottom portion having a notch formed therein, said case having a passage communicating with said notch, a movable leg pivotally secured within said notch, said movable leg having a tongue portion extending within said passage, whereby the travel of the movable leg towards the fixed leg is limited by the abutment of the tongue against a side wall of the passage and the travel away from the fixed leg is limited by the abutment of the movable leg against the case, said movable leg being provided with a bearing surface cooperating with the bearing surface of said fixed leg and the bearing surface of said bottom portion to provide a three-point contact arrangement, the bearing surface of the fixed leg merging smoothly with the bearing surface of the case and the latter merging smoothly with the bearing surface of the movable leg to provide a substantially smooth and continuous contact surface, an indicating mechanism mounted in said case, and means connecting said indicating means and said tongue.

10. For measuring rotating padded ironer rolls, a caliper comprising a case having a bottom portion including a bearing surface, a fixed leg integral with said case adjacent one end of said bottom portion, said fixed leg being provided with a bearing surface, the other end of said bottom portion having a notch formed therein, said case having a passage communicating with said notch, a movable leg pivotally secured within said notch, said movable leg having a tongue portion extending within said passage, whereby the travel of the movable leg towards the fixed leg is limited by the abutment of the tongue against a side wall of the passage and the travel away from the fixed leg is limited by the abutment of the movable leg against the case, said movable leg being provided with a bearing surface cooperating with the bearing surface of said fixed leg and the bearing surface of said bottom portion to provide a three-point contact arrangement, the bearing surface of the fixed leg merging smoothly with the bearing surface of the case and the latter merging smoothly with the bearing surface of the movable leg to provide a substantially smooth and continuous contact surface, resilient means mounted on said case, said resilient means being adapted to bear against said movable leg to continuously urge it towards said fixed leg, an indicating mechanism mounted in said case, and means connecting said indicating means and said tongue.

References Cited in the file of this patent

UNITED STATES PATENTS

| | | |
|---|---|---|
| 454,516 | Brown | June 23, 1891 |
| 2,080,534 | Darlington | May 18, 1937 |
| 2,362,907 | Levin | Nov. 14, 1944 |